United States Patent [19]

Lange et al.

[11] Patent Number: 4,487,911

[45] Date of Patent: Dec. 11, 1984

[54] STABLE POLYAMIC ACIDS

[75] Inventors: Daniel J. Lange, St. Louis, Mo.; Daniel J. Marquardt, Columbia, Ill.

[73] Assignee: The P. D. George Company, St. Louis, Mo.

[21] Appl. No.: 164,488

[22] Filed: Jun. 30, 1980

Related U.S. Application Data

[63] Continuation-in-part of Ser. No. 59,533, Jul. 23, 1979, abandoned.

[51] Int. Cl.$^3$ ............... C08G 69/32; C08G 73/10; C08G 73/12; C08G 73/14
[52] U.S. Cl. ............... 528/125; 428/458; 524/104; 528/126; 528/128; 528/224; 528/229; 528/351; 528/353
[58] Field of Search ............... 528/353, 351, 125, 128, 528/126, 224, 229

[56] References Cited

U.S. PATENT DOCUMENTS

| | | | |
|---|---|---|---|
| 3,179,614 | 4/1965 | Edwards | 260/30.2 |
| 3,179,631 | 4/1965 | Endrey | 260/78 |
| 3,179,632 | 4/1965 | Hendrik | 260/78 |
| 3,179,633 | 4/1965 | Endrey | 260/78 |
| 3,179,634 | 4/1965 | Edwards | 260/78 |
| 3,629,180 | 12/1971 | Yoda et al. | 528/351 X |
| 3,652,500 | 3/1972 | Peterson | 528/351 X |
| 3,663,492 | 5/1972 | Behr | 528/351 X |
| 3,663,510 | 5/1972 | Peterson | 528/351 X |
| 3,770,686 | 11/1973 | Torelli | 528/351 X |
| 3,891,601 | 6/1975 | Peterson et al. | 528/351 X |

Primary Examiner—Howard E. Schain
Attorney, Agent, or Firm—Sidney B. Ring; Hyman F. Glass; Leon Zitven

[57] ABSTRACT

A stable solution of an aromatic polyamic acid of controlled molecular weight, of the type capable of being converted to polyimides, which undergoes relatively little change in viscosity or gelling over extended periods of time at room temperature. Such solution may be prepared by reacting impure aromatic dianhydride with aromatic diamine in a suitable solvent where the ratio of active aromatic diamines is approximately equimolar. Such solution may also be prepared by a two step process which comprises:

Step I-Reacting a dianhydride of high purity (99+%) with a diamine in a molar ratio of about 0.95/1 dianhydride/diamine to yield a viscosity below about 10,000 cps, for example from about 2,000 to 6,000 at about a 10–15% solution.

Step II-Then adding to I about 0.05 mole of a less pure dianhydride such as from about 97–99% pure dianhydride to yield a 10–15% solution of polyamic acid having a viscosity of about 10,000 cps.

7 Claims, No Drawings

STABLE POLYAMIC ACIDS

This application is a continuation-in-part of Ser. No. 59,533 filed July 23, 1979, now abandoned.

In general, polyimides have been prepared by reacting dianhydrides with diamines to yield polyamic acids which are then cured to polyimides according to the following equations:

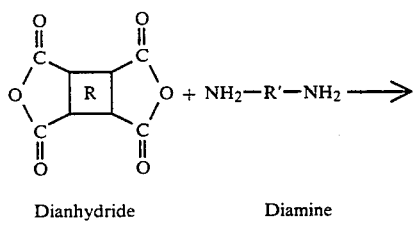

Dianhydride    Diamine

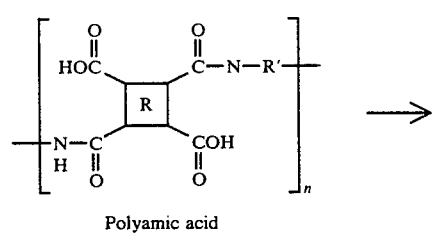

Polyamic acid

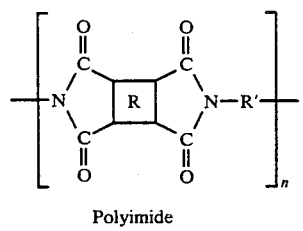

Polyimide

This is illustrated by the reaction of Pyromellitic Dianhydride (PMDA) with oxydianiline (ODA)

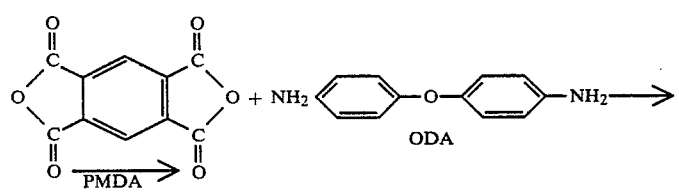

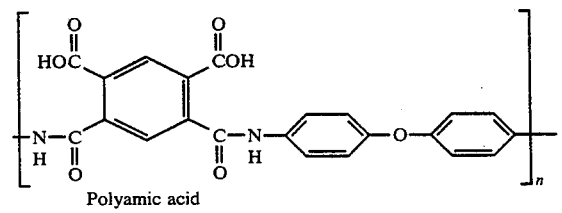

Polyamic acid and/or

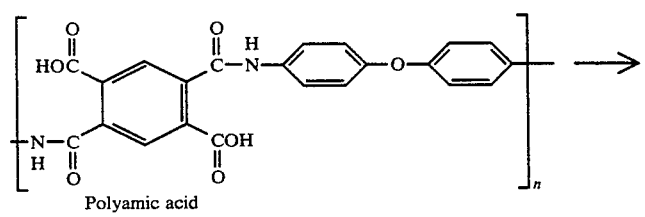

Polyamic acid

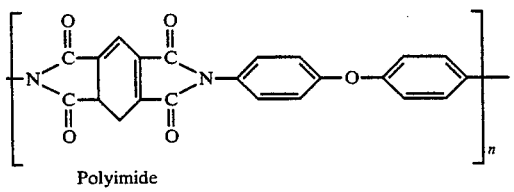

Polyimide

The Theoretical molar ratio employed is 1/1 PMDA/ODA

Commercially, polyamic acid precursor is first prepared, then applied in solution form to the desired surface and then cured.

In order to optimize the properties of the polyamic acid from the viewpoint of handling and final curing, it is highly desirable to use pure reactants in 1:1 molar

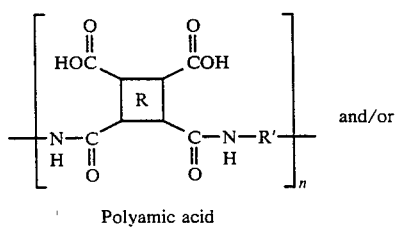

and/or

Polyamic acid ratios in order to yield Commercial Polyamic acid which is generally sold at a molecular weight which at about a 10–16% concentration has a viscosity of about 600 cps to 10,000 cps.

When one attempts to prepare a polyamic acid of the desired molecular weight by reacting equimolar amounts of very pure dianhydride and diamine, the molecular weight obtained as a 10–16% solution is difficult to control, generally yielding too high a molecular weight. Stated another way, the molecular weight of polyamic acid at 10–16% prepared in a 1 step process by reacting the very pure dianhydride and diamine is too difficult to control to achieve the desired viscosity.

Ser. No. 59,533, filed July 29, 1979, now abandoned describes a process of controlling the viscosity of a solution of polyamic acid by a two step process which comprises Step I. Reacting a dianhydride having a purity of about 99+% with a diamine in a molar ratio of about 0.95/1 dianhydride/diamine to yield a viscosity below about 10,000 cps, such as from about 1,000 to 8,000, for example from about 2,000 to 7,000, but preferably from about 2,000 to 6,000, at about a 10–15% solution.

Step II. Then adding to I about 0.05 mole of a less pure dianhydride, such as from about 97–99% pure dianhydride, to yield a 10–15% solution of polyamic acid having a viscosity of about 10,000 cps.

The term "about 10,000 cps" as employed herein and in claims means a solution at about 10–15% (weight percent) having a viscosity of 10,000 cps±1500 cps.

In addition to having the desired viscosity at a desired concentration, the two step product is more shelf stable than the polyamic acid prepared by a one step process.

Stated another way, the two step process achieves greater viscosity and stability control. It optimizes a product most suitable for coating objects such as wires.

The comparison of the two step process to the one step process may be summarized as follows:

| | Characteristics of Final Product |
|---|---|
| A. One Step Process | |
| 1:1 Molar Ratio 99+% pure PMDA/ODA in suitable solvent at 10–15% concentration. | (1) Difficult to control molecular weight so as to yield desired viscosity of about 10,000 cps. (2) Unstable Shelf Life Molecular weight and viscosity reduced on aging. |
| B. Two Step Process | |
| Step I .95/1 Molar Ratio 99+% pure PMDA/ODA suitable solvent at 10–15% concentration. | (1) Molecular weight controlled to yield desired viscosity of 10,000 cps. |
| Step II .05 Mole of 97–99% pure PMDA (or other dianhydride) is added to I. | (2) Stable Shelf Life |

Shelf stable means stable at room temperature.

The following examples are presented for purposes of illustration and not of limitation.

All viscosity measurements were made in a solvent comprising 80% by weight of N-methyl pyrrolidone and 20% by weight of a hydrocarbon (100 type solvent—boiling range 310°–345° F.).

EXAMPLE 1

Step I Into about 2611 grams of a solvent comprising 80% by weight of N-methyl pyrrolidone and 20% by weight of a hydrocarbon (100 type solvent—Boiling range 310°–345° F.) was dissolved 1 mole of oxydianiline

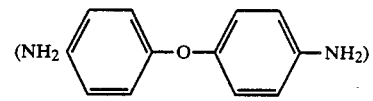

(ODA) and 0.95M of 99.9% pure pyromellitic dianhydride (PMDA) was added thereto.

Step II Thereupon 0.05M PMDA (97–99% purity) was added thereto. The addition of Step I and Step II took place at ambient temperature over a period of about 2 to 3 hours where exotherm raised the temperature to about 115° F.

The filtered product had a weight concentration of about 13% solids and a viscosity of about 9–10,000 cps.

EXAMPLE 2

Example 1 was repeated except that 0.05M of benzophenone tetracarboxylic dianhydride (BTDA) (97–99% purity) was employed in place of 0.05M of PMDA in Step II, and 2643 grams of N-methyl pyrrolidone hydrocarbon (80/20) solvent was used to accommodate the weight solids concentration.

The filtered product had a concentration of 13.0% solids and a viscosity of 9420 cps.

Modifications of the process of Example 1 were repeated with the reactants indicated in the following table.

TABLE I

| Ex- | Step I | | | | Step II | |
|---|---|---|---|---|---|---|
| am-ple | Dianhydride | Mole | Diamine | Mole | Dianhydride | Mole |
| 3 | PMDA | .70 | ODA | 1.0 | BTDA Theory | .30 |
| | | | | | Required | .3275 |
| 4 | PMDA | .80 | ODA | 1.0 | BTDA Theory | .20 |
| | | | | | Required | .22 |
| 5 | PMDA | .85 | ODA | 1.0 | BTDA Theory | .15 |
| | | | | | Required | .175 |

In the above Table I, Step II, the theoretical amount of BTDA is indicated. However, in order to obtain a desired viscosity of about 10,000 cps the required amount indicated was added. However, the properties of the products were poor in relation to shelf life, and in relation to the physical wire properties.

The following examples illustrate the one step process.

EXAMPLE 6

Into 2611 grams of solvent comprising 80% by weight of N-methyl pyrrolidone and 20% by weight of a hydrocarbon (100 type solvent, Boiling range 310°–345° F.) was dissolved 1 mole ODA; to which was added 1 mole of 99.9% pure PMDA over a period of 30 minutes with an exotherm yielding a final temperature of about 115° F. The product had a concentration of about 13% and a viscosity of about 50,000 cps.

The above example was repeated with the following reactants as outlined in the following table.

TABLE II

| Example | Diamine | Mole | Dianhydride | Mole | Comments |
|---|---|---|---|---|---|
| 6 | ODA | 1.0 | PMDA | 1.0 | High Viscosity and Molecular Weight Poor shelf life |
| 7 | ODA | 1.0 | PMDA 96-98% purity | 1.04 | Poor shelf life Poor wire results |

The shelf stability of the following examples were compared with the following results.

TABLE III

| Ex. | Viscosity when made | Weight % of Solids to total | Manufacturing Process-Diamine to Dianhydride Mole Ratio | Viscosity Stability | Remarks |
|---|---|---|---|---|---|
| 2 | 9420 cps | 13.0 | 2 step process 1:.95 + .05 Mole Ratio | 9420→10380 in 21 days →10580 in 33 days | Essentially stabilized. Good stability and viscosity control |
| 6 | 10500 cps | 8.3 | 1 step process 1:1 Mole Ratio | 10500→2220 in 26 days | Poor stability and viscosity control |
| Commercial Polyamic Acid | 10800 cps | 11.3 | | 10800→3500 2-4 months | Poor stability and lower M.W. |
| 7 | 12500 cps | 7.5 | 1 step process 1:1.04 mole Ratio | 12500→4760 in 25 days | Poor properties Stability and Viscosity Control |

The description in Ser. No. 59,533 is one embodiment of an invention of broader scope.

In its broad scope, the invention comprises a process of preparing shelf stable polyamic acid of a controlled molecular weight by a process which comprises reacting a diamine with a dianhydride having a controlled amount of impurities.

For whatever the reasons, the impurities present in the dianhydride facilitate the preparation of shelf stable polyamic acid of controlled molecular weight.

The amount of impurities present in the dianhydride can vary widely, depending on the particular anhydrides employed, the particular ratio of the anhydrides, the molar ratio of dianhydrides to diamines, etc. For example, where both pyromellitic dianhydride (PMDA) and Benzophenone tetracarboxylic dianhydride (BTDA) are employed, where the PMDA has a minimum purity of approximately 99.6%, and the BTDA has a purity of approximately 96-99%, the weight ratio of PMDA to BTDA can vary for example from about 80 to 20 to 95 to 5.

Where only one dianhydride is employed, (instead of two types of anhydride as stated above) a shelf stable polyamic acid of controlled molecular weight can also be formed. Thus, for example, one can employ 95% of PMDA of 99.8% purity and 5% of PMDA of 96% purity, to yield a shelf stable polyamic acid of controlled molecular weight.

Stated another way, there are certain impurities in commercial grades of dianhydrides which allow one to prepare the shelf stable polyamic acids of this invention. This shelf stability cannot be achieved by employing pure anhydrides.

Whatever the impurities in the dianhydrides it is desirable to determine the approximate purity of the dianhydride in the commercial dianhydride so that they can be adjusted to react with an approximately equal molar ratio of diamines. In general, it is desirable to have the actual molar ratio of diamines to dianhydrides based on purity approximately equimolar, such as a molar ratio of diamine to dianhydride of approximately about $1(\pm 0.02)$ to $1(\pm 0.02)$, but preferably $1(\pm 0.01)$ to $1(\pm 0.01)$, but optimally $1(\pm 0.001)$ to $1(\pm 0.001)$.

The polyamic acids described herein are of the type generally polymerized to polyimide resins and the dianhydrides and diamines are those employed to prepare said polyamic acid in any suitable solvent. These dianhydrides, diamines, solvents, polyamic acids and polyimides are well known to one skilled in the art and are described in the following U.S. Pat. Nos.: 3,179,614; 3,179,630-1-2-3-4 and elsewhere.

In the examples described in Ser. No. 59,533, oxydianiline (ODA) was dissolved in the solvent and then PMDA was dissolved followed by the solution of BTDA to effect the reaction (Procedure A).

Another order of addition can also be employed. For example, ODA is dissolved in the solvent; then BTDA is dissolved followed by the solution of PMDA to effect the reaction. This order of solution facilitates the solution of BTDA in lower solids solution before the solution of PMDA (Procedure B).

A series of illustrative examples were prepared according to Procedure B, illustrating the preparation of various solution concentrations, molecular weight ranges, viscosities, and ratios of PMDA to BTDA.

These results are presented in Table IV.

TABLE IV

| Ex. | VISC. @ 30° C. cps | Wgt. % Solids | APPROX. M.W. | Wgt. Ratio PMDA*—BTDA** | | Molar Ratio ***Diamine to Dianhydride |
|---|---|---|---|---|---|---|
| 1 | 8000-10000 | 11-14% | 1,700,000 | 95 | 5 | 1:.99-1.0 |
| 2 | 600-1000 | 11-13% | 1,260,000 | 90 | 10 | 1:.99-1.0 |
| 3 | 6000-8000 | 13-16% | 1,550,000 | 92 | 8 | 1:.99-1.0 |
| 4 | 4000-6000 | 13-16% | 1,260,000 | 90 | 10 | 1:.99-1.0 |

TABLE IV-continued

| Ex. | VISC. @ 30° C. cps | Wgt. % Solids | APPROX. M.W. | Wgt. Ratio PMDA*—BTDA** | Molar Ratio ***Diamine to Dianhydride |
|---|---|---|---|---|---|
| 5 | 1500-2000 | 12-15% | — | 80  20 | 1:.99-1.0 |

In the above table the solvent is:
80% Wgt. N—methyl pyrrolidone
20% Wgt. Hydrocarbon (100 type solvent Boiling range 310-345° F.)
*Purity minimum 99.8%
**Purity approximately 96-99%

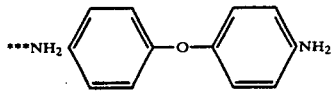

The term stable or shelf stable means that solutions of polyamic acid can be maintained at approximately room temperature for extended periods of times such as at least 3 months, for example from about 3 to 12 months, but preferably from about 6 to 12 months, with a minimum of degradation in molecular weight with resultant viscosity loss and gelling. This is in contrast to conventional commercial polyamic acids which must be maintained under refrigeration to prevent such degradation. This is illustrated by Dupont, essentially the only supplier of these products. Its literature relating to Pyre-ML ® Wire Enamels states:

"Viscosity Stability

"The viscosity, as manufactured, is not stable but gradually drops to about ⅔ of the original viscosity and then increases to a gel. Gelation occurs in approximately 14 days at 120° F. (49° C.), 30 days at 100° F. (38° C.) and 90 days at 77° F. (25° C.). At 40° F. (4° C.) it will not gel in a year. Refrigerated storage is recommended. Storage in an unheated building may be acceptable in the winter.

"Moisture contamination has a detrimental effect on viscosity stability, and must be avoided."

Thus, it is quite clear from the above that commercial products currently sold pose stability problems.

The shelf stability of the products of this invention are presented in the following Table V. It is to be noted from Table V that after some initial reduction in viscosity, the products remain relatively stable for months. Over the test period the products do not degrade but in some instances actually increase in viscosity. In no instance, during the stability tests, did gelation occurs. This is in contrast to the prior art when degradation and gelation occur under such conditions during the same test period.

The products in Table V were prepared in the manner of those in Table IV. In order to differentiate from the products in Table IV, the products in Table V have a letter after the number given to those products in Table IV. For example, Table V, Ex. 1A and 1B were prepared in the manner of Table IV, Ex. 1; Table V, Ex. 2A and 2B were prepared in the manner of Table IV, Ex. 2, etc.

TABLE V

ROOM TEMPERATURE STABILITY

SPECIFICATIONS 11%-14% Wgt. % Solids 8000 cps-10000 cps @ 30° C.

| Ex. | Initial | 1 mo. | 3 mos. | 4 mos. | 6 mos. | 8 mos. | 9 mos. | 10 mos. | 11 mos. | 13 mos. |
|---|---|---|---|---|---|---|---|---|---|---|
| 1A | 8800 | 8760 | 6700 | — | — | 8200 | — | — | — | 10,800 |
| 1B | 8650 | — | — | 8800 | — | — | — | — | — | — |
| 1C | 8080 | 7020 | — | — | 8140 | — | 9040 | 9400 | — | — |

CONCLUSION The stability of this product was at least 10 to 11 months, still remaining within the viscosity specification. Gelation did not occur during test period.

SPECIFICATIONS 11%-13% Wgt. % Solids 600 cps-1000 cps @ 30° C.

| Ex. | Initial | 5 mos. | 6 mos. | 9 mos. |
|---|---|---|---|---|
| 2A | 704 | 742 | 885 | 1300 |
| 2B | 705 | — | 805 | 1147 |

CONCLUSION The stability of the above product was at least six months, still remaining within the viscosity specification. Gelation did not occur during test period.

SPECIFICATIONS 13%-16% Wgt. % Solids 6000 cps-8000 cps @ 30° C.

| Ex. | Initial | 3 mos. | 5 mos. | 6 mos. | 8 mos. | 9½ mos. |
|---|---|---|---|---|---|---|
| 3A | 6370 | 6000 | — | 9040 | 14960 | — |
| 3B | 6000 | — | 7020 | — | — | 13000 |

CONCLUSION The stability of this product was at least 5-6 months, still remaining within the viscosity specification. Gelation did not occur during test period.

SPECIFICATIONS 13%-16%-16% Wgt. Solids 4000-7000 cps @ 30° C.

| Ex. | Initial | 1 mo. | 2 mos. | 3 mos. | 5 mos. | 6 mos. | 9 mos. |
|---|---|---|---|---|---|---|---|
| 4A | 5600 | — | 5800 | — | 11300 | — | 30000 not gelled |
| 4B | 4180 | 4100 | — | 5100 | — | 7040 | — |

CONCLUSION The product 4B was stable at least 6 months, still remaining within the viscosity specification. Gelation did not occur during test period.

The process for preparing the polyamide-acid compositions (also called polyamic acids) comprises reacting by mixing at least one organic diamine having the structural formula:

$$H_2N-R'-NH_2$$

wherein R' is a divalent radical containing at least 2 carbon atoms, the two amino groups of said diamine each attached to separate carbon atoms of said divalent radical; with at least one tetracarboxylic acid dianhydride having the structural formula:

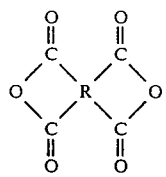

wherein R is an organic tetravalent radical containing at least 2 carbon atoms, no more than 2 carbonyl groups of said dianhydride attached to any one carbon atom of said tetravalent radical; in an organic solvent for at least one reactant, said solvent being inert to the reactants, preferably under anhydrous conditions, for a time, sufficient to provide the corresponding polyamide-acid.

Furthermore, in determining a specific time and a specific temperature for forming the polyamide-acid of a specified diamine and a specified dianhydride, several factors must be considered. The maximum permissible temperature will depend on the diamine used, the dianhydride used, the particular solvent, the percentage of polyamide-acid desired in the final composition and the minimum period of time that one desires for the reaction. For most combinations of diamines and dianhydrides falling within the definitions given above, it is possible to form compositions of 100% polyamide-acid by conducting the reaction below 100° C. However, temperatures up to 175° C. may be tolerated. The particular temperature below 175° C. that must not be exceeded for any particular combination of diamine, dianhydride, solvent and reaction time to provide a reaction product will vary but can be determined by a simple test by any person of ordinary skill in the art.

The starting materials for forming the products of the present invention are organic diamines and tetracarboxylic acid dianhydrides. The organic diamines are characterized by the formula: $H_2N—R'—NH_2$, wherein $R'$, the divalent radical, may be selected from the following groups: aromatic, aliphatic, cycloaliphatic, combination of aromatic and aliphatic, heterocyclic, bridged organic radicals wherein the bridge is oxygen, nitrogen, sulfur, silicon or phosphorous and substituted groups thereof. The most useful diamines are the primary diamines. Although secondary diamines such as piperazine may be used to produce the polyamide-acid compositions of the present invention, only the primary diamines, upon reaction with the dianhydrides, provide polyamide-acids which after shaping may be converted into the polyimides. The preferred R' groups in the diamines are those containing at least 6 carbon atoms characterized by benzenoid unsaturation, i.e., alternate double bonds in a ring structure. Among the diamines which are suitable for use in the present invention are: meta-phenylene diamine; paraphenylene diamine; 4,4'-diamino-diphenyl propane; 4,4'-diamino-diphenyl methane; benzidine; 4,4'-diamino-diphenyl sulfide; 4,4'-diamino-diphenyl sulfone; 3,3'-diamino-diphenyl sulfone; 4,4'-diamino-diphenyl ether; 2,6-diamino-pyridine; bis-(4-aminophenyl)-N-methylamine; 1,5-diamino-naphthalene; 3,3'-dimethyl-4,4'-diamino-biphenyl; 3,3'-dimethoxy benzidine; 2,4-bis(beta-amino-t-butyl)toluene; bis-(para-beta-amino-t-butyl-phenyl)ether; para-bis-(2-methyl-4-amino-pentyl)benzene; para-bis-(1,1-dimethyl-5-amino-pentyl)benzene; m-xylylene diamine; p-xylylene diamine; bis(para-aminocyclohexyl)methane; hexamethylene diamine; heptamethylene diamine; octamethylene diamine; nonamethylene diamine; decamethylene diamine; 3-methylheptamethylene diamine; 4,4-dimethylheptametylene diamine; 2,11-diamino-docecane; 1,2-bis-(3-amino-propoxy)ethane; 2,2-dimethyl propylene diamine; 3-methoxy-hexamethylene diamine; 2,5-dimethylhexamethylene diamine; 2,5-dimethylheptamethylene diamine; 5-methylnonamethylene diamine; 1,4-diamino-cyclohexane; 1,12-diamino-octadecane; $H_2N(CH_2)_3O(CH_2)_2O(CH_2)_3NH_2$; $H_2N(CH_2)_3S(CH_2)_3NH_2$; $H_2N(CH_2)_3N(CH_3)(CH_2)_3NH_2$; and mixtures thereof.

The tetracarboxylic acid dianhydrides are characterized by the following formula:

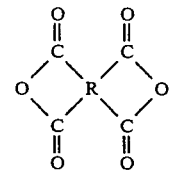

wherein R is a tetravalent organic radical selected from the group consisting of aromatic, aliphatic, cycloaliphatic, heterocyclic, combination of aromatic and aliphatic, and substituted groups thereof. However, the preferred dianhydrides are those in which the R groups have at least 6 carbon atoms characterized by benzenoid unsaturation, i.e., alternate double bonds in a ring structure, wherein the 4 carbonyl groups of the dianhydride are each attached to separate carbon atoms and wherein each pair of carbonyl groups is directly attached to adjacent carbon atoms in the R group to provide a 5-membered ring as follows:

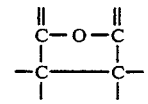

The preferred dianhydrides, as recited above, yield upon reaction with the diamines polyamide-acid structures having outstanding physical properties. Illustrations of dianhydrides suitable for use in the present invention include: pyromellitic dianhydride; 2,3,6,7-naphthalene tetracarboxylic dianhydride; 3,3',4,4'-diphenyl tetracarboxylic dianhydride; 1,2,5,6-naphthalene tetracarboxylic dianhydride; 1,2,3,4-cyclopentane tetracarboxylic dianhydride; 2,2',3,3'-diphenyl tetracarboxylic dianhydride; 2,2-bis(3,4-dicarboxyphenyl)propane dianhydride; 3,4-dicarboxyphenyl sulfone dianhydride; 2,3,4,5-pyrrolidine tetracarboxylic dianhydride; 3,4,9,10-perylene tetracarboxylic dianhydride; bis(3,4-dicarboxyphenyl)ether dianhydride; ethylene tetracarboxylic dianhydride; 3,3',4,4'-benzophonone tetracarboxylic dianhydride, etc.

The following are the specifications for commercial reactants employed herein.

Dupont 4,4'-OXYDIANILINE TECHNICAL

SOCMA Registry Number: 101804

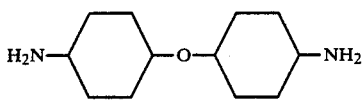

Molecular Weight: 200.2

Descriptive Information:

This product is a light pink to white powder that is soluble in dilute hydrochloric acid and has a melting range in excess of 189.0° C.

Sales Specification:

(1) Its minimum purity by nitrite absorption shall be 99.5%.

(2) Its maximum content of volatile matter shall be 0.25% as determined by vacuum drying at 80° C. for six hours.

(3) Its melting range shall be higher than 189.0° C., as determined by standard melting range procedure.

(4) Its maximum iron content shall be 50 ppm.

(5) Its maximum nitrobody content, calculated as dinitrodiphenyl ether, shall be 0.10%.

(6) Its maximum content of acid insoluble impurities shall be 0.1%.

(7) Its minimum light transmission as a 1% solution in freshly distilled dimethylacetamide, measured at 450 millimicrons in a 2-cm. cell, shall be 65%.

| GULF BTDA* PRODUCT SPECIFICATIONS** | | | |
|---|---|---|---|
| PROPERTY | SPECIFICATION | | |
| BTDA Content, Gulf 990: Wt. % | min. | 97.0 | |
| BTA Content, Gulf 991: Wt. % | max. | 3.0 | |
| Inerts, Gulf 1253: Wt. % | max. | 0.20 | |
| Color, Gulf 992: Klett Units | max. | 300 | |
| Mesh Analysis, Gulf 1019: Wt. % | | | |
| Grade: | Coarse | Fine | Super Fine |
| Thru 30 mesh | 99.0% min. | — | — |
| Thru 100 mesh | — | 95.0 min. | 99.0 min. |
| Thru 200 mesh | — | 85.0 min. | 92.0 min. |
| Thru 325 mesh | 50.0% max. | — | — |
| Thru 400 mesh | — | 65.0 min. | 75.0 min. |
| Bulk Density: | | | |
| Lbs./Cu. Ft. | 63.6–74.8 | 52.4–61.7 | 41.1–50.5 |
| gm/cc | 1.02–1.20 | 0.84–0.99 | 0.66–0.81 |

*3,3',4,4'Benzophenone Tetracarboxylic Dianhydride or 4,4'Carbonyldiphthalic Anhydride.
**As shipped.

VEBA-CHEMIE AG
DIANHYDRIDE
(benzene tetracarboxylic-1,2,4,5-dianhydride)
$C_{10}H_2O_6$

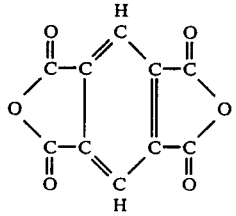

| Specification: | |
|---|---|
| Molecular weight | 218.12 |
| Colour | almost white |
| Melting point | 284–286° C. |

-continued

VEBA-CHEMIE AG
DIANHYDRIDE
(benzene tetracarboxylic-1,2,4,5-dianhydride)
$C_{10}H_2O_6$

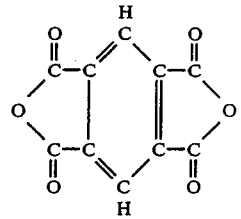

| | | |
|---|---|---|
| Density | | 1.68 |
| Boiling point 760 torr | | 397–400° C. |
| Boiling point 30 torr | | 305–310° C. |
| Purity | | min. 99.5% |
| Solubility in: | | |
| Acetone | 20° C. | 7 g/100 g solvent |
| | 56° C. | 9 g/100 g solvent |
| Dimethyl sulphoxide | 20° C. | 20 g/100 g solvent |
| | 120° C. | 95 g/100 g solvent |
| Dimethyl formamide | 20° C. | 16 g/100 g solvent |
| | 140° C. | 100 g/100 g solvent |

The solvents useful in the solution polymerization process for synthesizing the polyamide-acid compositions of the present invention are the organic solvents whose functional groups do not react with either of the reactants (the diamines or the dianhydrides) to a greater extent than the reactants do with each other. Besides being inert to the system and, preferably, being a solvent for the product, the organic solvent must be a solvent for at least one of the reactants, preferably for both of the reactants. To state it another way, the organic solvent is an organic liquid other than either reactant or homologs of the reactants that is a solvent for at least 1 reactant, and contains functional groups, the functional groups being groups other than monofunctional primary and secondary amino groups and other than the monofunctional dicarboxyl-anhydro groups. The normally liquid organic solvents of the N,N-dialkylcarboxylamide class are useful as solvents in the process of this invention. The preferred solvents are the lower molecular weight members of this class, particularly N,N-dimethylformamide and N,N-dimethylacetamide. They may easily be removed from the polyamide-acid and/or polyamide-acid shaped articles by evaporation, displacement or diffusion. Other typical compounds of this useful class of solvents are: N,N-diethylformamide, N,N-diethylacetamide, N,N-dimethylmethoxy acetamide, N-methyl caprolactam, etc. Other solvents which may be used in the present invention are: dimethylsulfoxide, N-methyl-2-pyrrolidone, tetramethylene urea, pyridine, dimethylsulfone, hexamethylphosphoramide, tetramethylene sulfone, formamide, N-methyl-formamide and N-acetyl-2-pyrrolidone. The solvents can be used alone, in combinations of solvents, or in combination with poor solvents such as benzene, benzonitrile, dioxane, butyrolactone, xylene, toluene, cyclohexane or other aromatic or aliphatic solvents.

These compositions may be applied to a variety of substrates, for example, metals, e.g. copper, brass, aluminum, steel, etc., the metals in the form of sheets, fibers, wires, screening, etc.; glass in the form of sheets, fibers, foams, fabrics, etc.; polymeric materials, e.g. cellulosic materials such as cellophane, wood, paper, etc., polyolefins such as polyethylene, polypropylene, polystyrene, etc., polyesters such as polyethylene terephthalate, etc., perfluorocarbon polymers such as polytetrafluoroethylene, copolymers of tetrafluoroethylene with hexafluorpropylene, etc., polyurethanes, all polymeric materials in the form of sheets, fibers, foams, woven and non-woven fabrics, screening, etc.; leather sheets, etc.

They are particularly useful for the following uses:
1. Wire enamel (base coat)
2. Wire enamel (overcoat)
3. High thermal resistant coatings.

Materials, such as wire, wire coated with the polyamic acid solutions of this invention and then cured to polyimides.

We claim:
1. A two step process of preparing
    a shelf stable polyamic acid solution resulting from the reaction of an aromatic tetracarboxylic acid dianhydride and an aromatic diamine in an organic solvent which is inert to the system and is a solvent for at least one of the reactants and the product, a solution of said polyamic acid in a solvent consisting of 80% N-methyl pyrrolidone and 20% of a hydrocarbon solvent of boiling range 310°–345° F. having a viscosity of about 10,000 cps at a concentration of about 10–15%
    which comprises:
        Step I—reacting an aromatic tetracarboxylic dianhydride of high purity with an aromatic diamine in a molar ratio of about 0.95/1 dianhydride/diamine in an organic reaction solvent which is insert to the system and is a solvent for at least one of the reactants and the product to yield a polyamic acid having a viscosity below about 10,000 cps in about 10–15% solution thereof in a solvent mixture consisting of 80% N-methyl pyrrolidone and 20% of a hydrocarbon solvent of boiling range 310°–345° F.;
        Step II—then adding to the Step I product about 0.05 mole of a less pure dianhydride to yield a polyamic acid having a viscosity of about 10,000 cps in about a 10–15% solution in said solvent mixture.
2. The process of claim 1 where the viscosity of the Step I product in said solvent mixture is about 2,000 to 6,000 cps.
3. A two step process of preparing the polyamic acid solution of claim 1
which comprises:
    Step I—reacting a high purity aromatic dianhydride selected from the group consisting of pyromellitic dianhydride, benzophenone dianhydride and mixtures thereof with an aromatic diamine in a molar ratio of about 0.95/1 dianhydride/diamine in an organic reaction solvent which is inert to the system and is a solvent for at least one of the reactants and the product to yield a polyamic acid having a viscosity below about 10,000 cps in about a 10–15% solution thereof in a solvent mixture consisting of 80% N-methyl pyrrolidone and 20% of a hydrocarbon solvent of boiling range 310°–345° F.,;
    Step II—then adding to the Step I product about 0.05 mole of a less pure dianhydride to yield a polyamic acid having a viscosity of about 10,000 cps in about a 10–15% solution in said solvent mixture.
4. The process of claim 3 where the viscosity of the Step I product is about 2,000 to 6,000 cps in said solvent mixture.
5. A two step process of preparing the polyamic acid solution of claim 3
which comprises
    Step I—reacting a high purity aromatic dianhydride selected from the group consisting of pyromellitic dianhydride, benzophenone dianhydride and mixtures thereof with oxydianiline in a molar ratio of about 0.95/1 dianhydride/oxydianiline in an organic reaction solvent which is inert to the system and is a solvent for at least one of the reactants and the product to yield a polyamic acid having a viscosity of about 10,000 cps in about a 10–15% solution thereof in a solvent mixture consisting of 80% N-methyl pyrrolidone and 20% of a hydrocarbon solvent of boiling range 310°–345° F.;
    Step II—then adding to the Step I product about 0.05 mole of a less pure dianhydride to yield a polyamic acid having a viscosity of about 10,000 cps in about a 10–15% solution in said solvent mixture.
6. The process of claim 5 wherein said reaction solvent consists of 80% N-methyl pyrrolidone and 20% of a hydrocarbon solvent of boiling range 310°–345° F.
7. The process of claim 5 where the viscosity of the Step I product is about 2,000 to 6,000 cps.

* * * * *